Aug. 26, 1958 C. G. SONTHEIMER 2,849,603

CONTROLLABLE INDUCTANCE VOLTAGE DIVIDER APPARATUS

Filed Nov. 5, 1954 2 Sheets-Sheet 1

INVENTOR
CARL G. SONTHEIMER
BY
Curtis, Morris & Safford
ATTORNEYS

CONTROLLABLE INDUCTANCE VOLTAGE DIVIDER APPARATUS

Filed Nov. 5, 1954

INVENTOR
CARL G SONTHEIMER
BY
Curtis Morris & Safford
ATTORNEYS 2,849,603
Patented Aug. 26, 1958

2,849,603

CONTROLLABLE INDUCTANCE VOLTAGE DIVIDER APPARATUS

Carl G. Sontheimer, Stamford, Conn., assignor to C. G. S. Laboratories, Inc., Stamford, Conn.

Application November 5, 1954, Serial No. 467,027

20 Claims. (Cl. 250—20)

The present invention relates to controllable inductance voltage divider method and apparatus, and is described as embodied in method and apparatus providing automatic control of the signal level in radio receivers.

In the voltage divider method and apparatus described herein pairs of controllable inductors are used. Each of these controllable inductors has a signal winding whose inductance is controlled in response to the magnitude of control current flowing through one or more control windings of the inductor. The signal windings are connected in series in pairs, and the alternating signals whose magnitudes are to be controlled are applied across the pair of signal windings. The controlled output is then obtained across one or the other of these signal windings. The relative inductance values of these signal windings are controlled to obtain the desired magnitude in the output signals, which becomes a function of the ratio of the inductance values of the pair of signal windings. In order to minimize any effect upon the source of the signals being controlled, the sum of the inductances of the pair of signal windings may be held constant while the individual inductance values are shifted in opposite directions. The inductance of either signal winding may be increased while the other is decreased; by increasing the relative value of the inductance of the winding across which the output is taken, the magnitude of the output signals is correspondingly increased.

Among the many advantages of the controllable inductance voltage dividers described are those resulting from the fact that they provide a continuous wide adjustment in the magnitude of the electric signals from a source, without affecting the impedance or frequency of the source.

Among the further advantages of the present invention is the fact that the controllable inductance voltage divider circuits have no moving parts, are rugged, and have an extremely long operating life. The type of voltage dividers described herein can be operated over a very large part of the entire electrical frequency spectrum.

Another advantage of the voltage dividers described is the fact that they are so well suited for automatic and for remote signal control applications. For example, the automatic control of the magnitude of the signals in radio receivers, called automatic volume control (A. V. C.) is a particular application in which I find many advantages for the inductance voltage dividers described.

It is customary in many radio receivers automatically to regulate the gain of one or more stages in the receivers in inverse proportion to the strength of the signal being picked up by the antenna. This automatic regulation prevents fluctuations in loudspeaker volume when the signal at the antenna is fading in and out. It also prevents an unpleasant blast of volume when the receiver is tuned from a station with a weak signal to another station with a strong signal. Also, when the receiver is tuned to strong radio stations, the A. V. C. serves to hold down the amplitude level of the signals in the stages of the receiver behind the controlled stage or stages, and so tends to prevent overdriving of these succeeding stages, thus tending to prevent the distortion which would result from overdriving.

The usual principle of the operation of A. V. C. is to derive a voltage at some point in the receiver circuit which is proportional to the average strength of the incoming signal. This voltage is then used to regulate continuously the working bias of the control electrodes in one or more of the amplifier stages and hence controls their gain as a function of the signal strength.

However, as now used, A. V. C. circuits have certain limitations. It is difficult with A. V. C. to accommodate changes in the strength of the signals from the antenna varying over a wide range in energy levels. The higher energy signals drive the early amplifier stages into their non-linear regions of operation, causing considerable distortion. Also, because of Miller effect which increases with increasing signal amplitude, the larger signals cause the input circuits to become detuned from the desired frequency, causing further distortion.

In the A. V. C. circuits described, controllable inductance voltage dividers are used automatically to provide optimum signal strength in the receiver.

The type of A. V. C. circuits described herein enable a receiver to be operated with the most extreme values of signal strength from the antenna, for example, with signals anywhere throughout the range from 1 microvolt to 10 volts. Moreover, these extreme ranges in signal strength are accommodated substantially without any distortion and without detuning the receiver input circuits, thus enabling high fidelity operation.

Among the many other advantages of the A. V. C. circuits shown is the fact that they have no "thump." That is, rapid changes in the degree of attenuation produce no audible output, as occurs in many conventional A. V. C. circuits. In the circuits described herein advantageously no direct current components are induced in the controlled elements by virtue of the control action.

The various aspects and advantages of the present invention will be more fully understood from the following description considered in conjunction with the accompanying drawings, in which.

Figure 1:
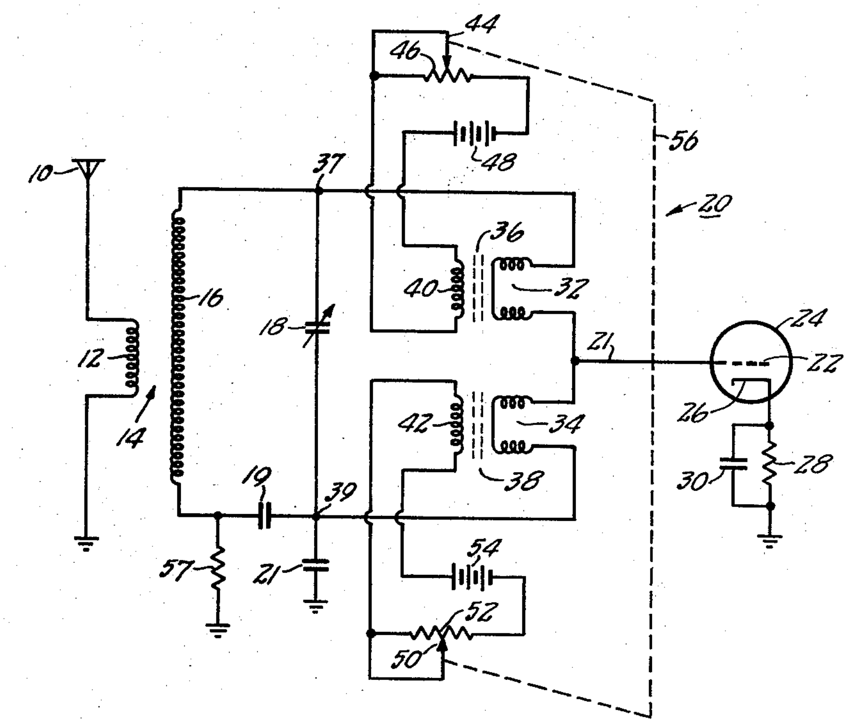
Figure 1 is a schematic circuit diagram of an antenna and input circuit of a radio receiver including an inductance voltage divider.

In the circuit of Figure 1 radio signals picked up by the antenna 10 are fed through the primary 12 of an air-cored transformer 14 to the common return circuit of the receiver. Corresponding voltages are induced in the secondary winding 16 which, together with a variable condenser 18 connected across the winding 16 in series with a blocking condenser 19, forms a parallel resonant circuit which is tuned to the frequency of the incoming signals, for example by adjusting the condenser 18. The lower side of this parallel resonant circuit is effectively "grounded" to a common radio frequency return circuit of the receiver by a condenser 21 connected from the lower end of the condenser 18.

A controllable inductance voltage divider circuit, generally indicated at 20, is used to control the fraction of the signal appearing across the secondary 16 which is fed through an output lead 21 to the next circuit, here shown as the grid 22 of a radio frequency amplifier tube 24 having its cathode 26 connected to the common return circuit through a cathode resistor 28 and by-pass condenser 30. The voltage divider 20 includes a first controllable inductor 31 having a variable inductance winding 32 connected between one end of the secondary 16 and the output lead 21 and a second controllable inductor 33 having a variable inductance winding 34 connected between the other end of the secondary 16 and the lead 21.

The windings 32 and 34 are each shown as divided into two oppositely wound halves connected in series, because the controlled inductance winding in the controllable inductors 31 and 33 are arranged in this way to minimize any magnetic coupling with the control circuits. The windings 32 and 34 are each wound on core portions 36 and 38 of magnetically permeable and saturable material, for example such as a ferrite or ferromagnetic ceramic material. The connections 37 and 39 at opposite ends of the winding 16 serve in effect as input terminals for the voltage divider circuit 20. The inductance of the windings 32 and 34 is controlled by regulating the incremental permeability of the core material by controlling the degree of its magnetic saturation, by means of control windings 40 and 42, or other suitable magnetic flux sources, associated with the core portions 36 and 38, respectively.

Controllable inductors of the type suitable for use in such a voltage divider arrangement are described in copending applications Serial Nos. 234,581, filed June 30, 1951, in the name of William D. Gabor, now U. S. Patent No. 2,755,446, issued July 17, 1956; 425,244, filed April 23, 1954, in the name of Carl G. Sontheimer.

In order to increase the voltage on the lead 21, the inductance of the winding 32 is reduced while the inductance of the winding 34 is increased. The inductance of the winding 32 is reduced, for example, by increasing the control current through the winding 40. A slidable contact 44 is moved along a resistor 46 connected in series with the control winding 40 and a suitable current source, such as the high voltage direct current power supply for the receiver, here indicated for convenience as a battery 48. At the same time the current through the control winding 42 is reduced by moving the contact 50 along resistor 52 to reduce the current from the source 54.

The current control arrangements 44 and 46 and 50 and 52 are, in effect, mechanically or electrically ganged together and automatically controlled, as described in detail hereinafter, and as indicated by the dotted line 56, so that as the inductance of either one of the windings 32 and 34 is changed, the inductance of the other winding is changed in the opposite direction by an amount to keep their sum constant, so as to prevent detuning the circuit. With controllable inductors as described in the above copending applications inductance changes of 100 to 1 are readily obtainable.

In order to explain the operation of this voltage divider circuit in Figure 1 in further detail, assume that it is tuned to a station having a medium signal strength and that the effective inductance of the secondary 16 is L millihenries. For medium alternating current output voltage on the lead 21, the inductances of the windings 32 and 34 are made equal at their medium value. They are each assumed to have a medium inductance value of 10.1 L. Thus, the sum of the inductances of the windings 32 and 34 at medium outputs is 20.2 L. And, this sum is to be held constant.

By fully saturating the core portion 36, the inductance of the winding 32 is dropped to .2 L. By simultaneously unsaturating the core 38, the inductance of the winding 34 is raised to 20 L or 100 times the inductance of the winding 32, and thus the A. C. voltage on the lead 21 is raised to about 99% of the voltage across the winding 16. Moreover, since the sum of .2 L and 20 L is still 20.2 L the resonant frequency of the tuned circuit has been held constant.

When the inductance of the winding 34 is lowered to .2 L and the inductance of the other winding 32 is raised to 20 L, the A. C. voltage on the lead 21 is now about 1% of the voltage across the winding 16, while the tuning of the resonant circuit is still unchanged. Thus, the voltage divider 20 enables a voltage change of about 100 times or a power difference of 40 decibels, without affecting the tuning of the resonant circuit.

The divider circuit enables the signal fed to the grid 22 to be adjusted to the optimum value, so that the tube 24 produces satisfactory gain with a minimum of distortion. Also, since the signal strength on the grid 22 is reduced, there is less voltage fluctuation between the grid 22 and the plate (not shown) of the tube 24, consequently the Miller effect is reduced and a marked reduction is obtained in any detuning effect on the resonant circuit 16, 18 caused by the Miller effect. Moreover, the voltage divider 20 tends to isolate any effect of the tube 24 from this resonant circuit, thus producing even further improvement in operation.

Where the resonant circuit 16, 18 has an ordinary value of "Q" of about 200, the above circuit can be arranged for negligible detuning of the order of only about ⅕ of 1% or less.

Where greater precision is required, the medium inductance values of the windings 32 and 34 can be raised relative to the inductance of the winding 16. For example, they can be raised to 101 L (or even more) in which case their sum is 202 L and they are each varied in opposite directions from 2 L to 200 L.

Where desired, this controllable voltage divider can be combined with a regular A. V. C. arrangement controlling the bias on the tube 24 so as to provide control of the gain of the tube 24 as well as control of the signal amplitude at its grid. For example, an A. V. C. signal voltage is fed through a resistor 57 so as to provide a controllable negative bias on the grid 22. With this arrangement signal strengths anywhere from 1 micro volt to 10 volts or even more are readily handled.

Figure 2:
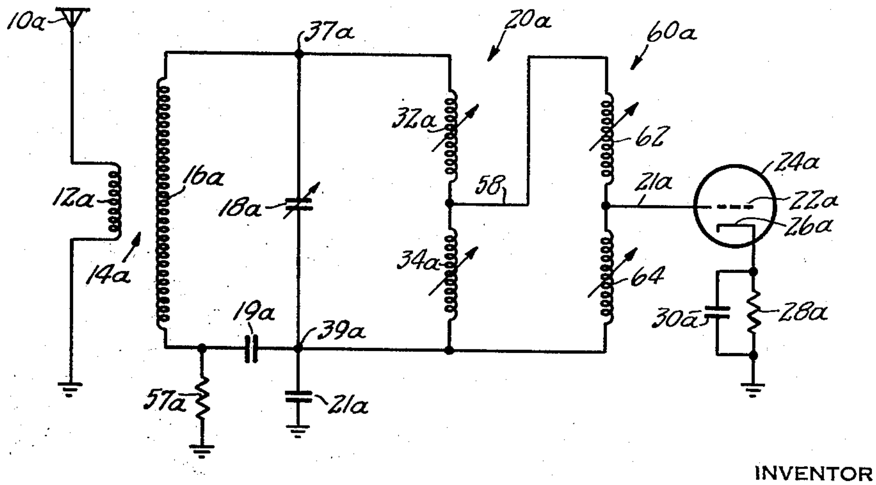
Figure 2 is a schematic circuit diagram of an input circuit of a radio receiver having a modified form of inductance voltage divider embodying the present invention.

The circuit of Figure 2 is generally along the lines of the circuit of Figure 1 and corresponding parts have corresponding reference numerals followed by the suffix "*a*." Certain simplifications have been made for purposes of convenience in illustrating the circuit of Figure 2, for example, all of the control windings and control current sources are omitted and the controllable inductance windings **32*a* and 34*a* and 62 and 64** are shown as undivided windings. However, their operation is similar to that in Figure 1 and also will be explained in detail in connection with the circuit of Figure 3.

In Figure 2, the output from the voltage divider **20*a*, which includes the upper and lower controllable inductance windings 32*a* and 34*a*, is fed through a lead 58, to the top of a second similar inductance divider, generally indicated at 60, including a pair of controllable inductance windings 62 and 64. The mid-point between the windings 62 and 64 is connected through the lead 21*a* to the grid 22*a*. The voltage dividers 20*a* and 60** are thus cascaded in operation.

Assuming that each of them can produce a change in signal strength of 100 to 1, then the total variation possible is 10,000 to 1 or 80 decibels of power.

Among the advantages of this cascaded voltage divider arrangement is that throughout a large portion of the range, when the inductance of the winding **34*a* is relatively small compared to that of the winding 32*a*, the divider 60 has very little detuning effect on the circuit, even assuming that substantial changes in the sum of the inductances of windings 62 and 64 occur. Hence, the second divider 60 is less critical in its control adjustment requirements. The inductance values of the windings 62 and 64 should track closely to the desired sum value for larger fractional inputs to the grid 22*a*** but need not for low fractional values when the inductance of the winding 34*a* is low.

Figure 3:
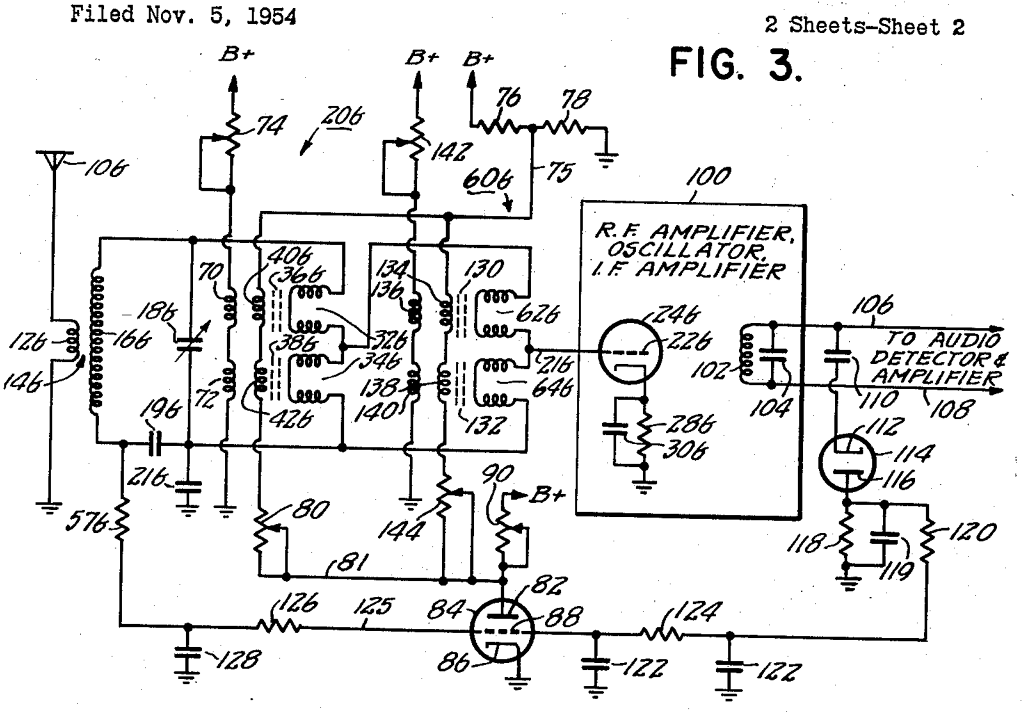
Figure 3 is a schematic circuit diagram, partially indicated in block form, illustrating method and apparatus for automatically controlling the signal level in a radio receiver.

In Figure 3 parts performing functions corresponding to those in Figures 1 and 2 have corresponding reference numbers followed by the letter suffix "*b*."

In order to produce the desired opposite swings in the inductances of the windings 32*b* and 34*b* a similar pair of control windings 40*b* and 70, and 42*b* and 72, respectively, is wound on each of the core portions 32*b* and 34*b*. To produce full saturation of either core 36*b* or 38*b*, so as to produce the minimum inductance value in the windings 32*b* or 34*b*, as the case may be, the currents in the pair of windings are arranged to add their magnetizing effects. To unsaturate either of the cores 36*b* or 38*b*, the magnetic effects of the pair of windings on the respective core are arranged to buck against each other and cancel each other out.

The windings 70 and 72 are connected in series between the common return circuit, which is suitably connected to the negative terminal of the high voltage direct current power supply (not shown), and an adjustable resistor 74 connected to a positive terminal of the power supply, indicated by the symbol B+. The resistor 74 is adjusted so that the fixed current in the windings 70 and 72, called the bias current, is effectively one-half of the value required to saturate the core 36*b* and 38*b*.

The windings 40*b* and 42*b* are connected in series, with the winding 40*b* connected through a lead 75 to the midpoint of a resistance voltage divider including a resistor 76 connected to B+ and a resistor 78 connected to the common circuit. The winding 42*b* is connected through an adjustable resistor 80 and a lead 81 to the plate 82 of a triode 84 with its cathode 86 grounded. The winding 40*b* is wound or connected in the same sense as the winding 70 so that when the same effective value of current flows down through the winding 40*b* as is flowing down through the bias winding 70, its magnetomotive force adds to that from the bias winding 70 and the core 36*b* becomes saturated. The winding 42*b* is arranged in the opposite sense from the winding 72 so that when the magnitude of the current flowing down through the winding 42*b* is equivalent to the bias current in the winding 72, their magnetomotive forces cancel and leave the core 38*b* unsaturated.

When the direction of the current in the windings 40*b* and 42*b* is reversed and its magnitude equals that of the bias current, then the core 36*b* becomes fully unsaturated, and the core 38*b* becomes fully saturated.

The resistance voltage divider 76 and 78 and the triode 84 is an arrangement for producing a controllable and reversible current in the windings 40*b* and 42*b*. When the grid 88 of this triode is near zero, i. e., at the same voltage as the cathode 86, the triode is in a condition of substantially full conduction. A large current flows from B+ down through an adjustable load resistor 90, lowering the voltage of the plate 82 far below the voltage of the lead 75 connected to the voltage divider 76, 78. Hence, a large current flows down through the control windings 40*b* and 42*b*, saturating the core 36*b* and unsaturating the core 38*b* so as to provide least attenuation of the signal reaching the lead 58*b*.

When the grid 88 becomes considerably negative with respect to the cathode 86, the voltage of the plate 82 becomes nearly equal to B+ voltage, and thus is far above the voltage of the lead 75. Hence, a large current now flows up through the windings 42*b* and 40*b*, increasing the attenuation of the signal reaching the lead 58*b*.

From the lead 58*b* the signal passes through a second voltage divider 60*b* cascaded with the divider 20*b* and reaches the lead 21*b* connected to the grid 22B of the first tube 24*b* in a radio frequency amplifier, oscillator, and intermediate frequency amplifier circuit, generally indicated in block form at 100, and which may be any such circuit suitable for use in a superheterodyne radio receiver.

The output from the circuit 100 appears across the secondary 102 of the last I. F. transformer which is tuned by a shunt condenser 104 to the I. F. frequency. This output is fed through the leads 106 and 108 to the audio detector and amplifier circuits, as indicated, and thence to the loudspeaker (not shown) as is well understood.

A portion of the voltage on the lead 106 is coupled through a condenser 110 to the cathode 112 of a diode rectifier tube 114 with its plate 116 connected to ground through a load resistor 118 shunted by a condenser 119. The diode 114 develops a negative voltage at the upper end of the condenser 119 which increases with increasing signal strength. This negative voltage is fed through a resistor 120 to a filter including a pair of condensers 122 connected to the common circuit with a resistor 124 therebetween and from this filter to the grid 88 of the triode 84. Thus, as the signal strength increases, the voltage on the grid 84 becomes more negative, causing the control current to produce a decrease in signal strength on the lead 58*b* connected between the controllable inductance windings 32*b* and 34*b*.

The negative voltage from the filter 122, 124 may also be fed through a lead 125 and a decoupling resistor 126 and across a filter condenser 128 to the resistor 57*b* so as to control the voltage bias on the grid 22*b* and hence the gain of the tube 24*b*.

The adjustable resistors 74, 80 and 90 are adjusted to produce the desired medium A. C. voltage on the lead 58*b* when a medium strength signal is received.

The voltage divider 60*b* is similar to divider 20*b* and is cascaded therewith. The windings 62*b* and 64*b* are wound on cores 130 and 132, respectively. Each core has an associated pair of windings 134 and 136, and 138 and 140, respectively. The bias windings 136 and 140 are connected in series between the common circuit and an adjustable resistor 142 connected to B+. The control windings 134 and 138 are connected in series between the lead 75 and an adjustable resistor 144 connected to the plate 82. The windings 134 and 136 are arranged in opposite sense so as to function similar to the windings 40*b* and 70. The resistors 142 and 144 are adjusted to produce the desired fractional output on lead 21*b* for each value of signal strength.

Instead of using the bias windings 70, 72, 136 and 140, suitably arranged bias fluxes can be established in the respective cores by means of permanent magnets so as to saturate these cores about half way.

Figure 4:
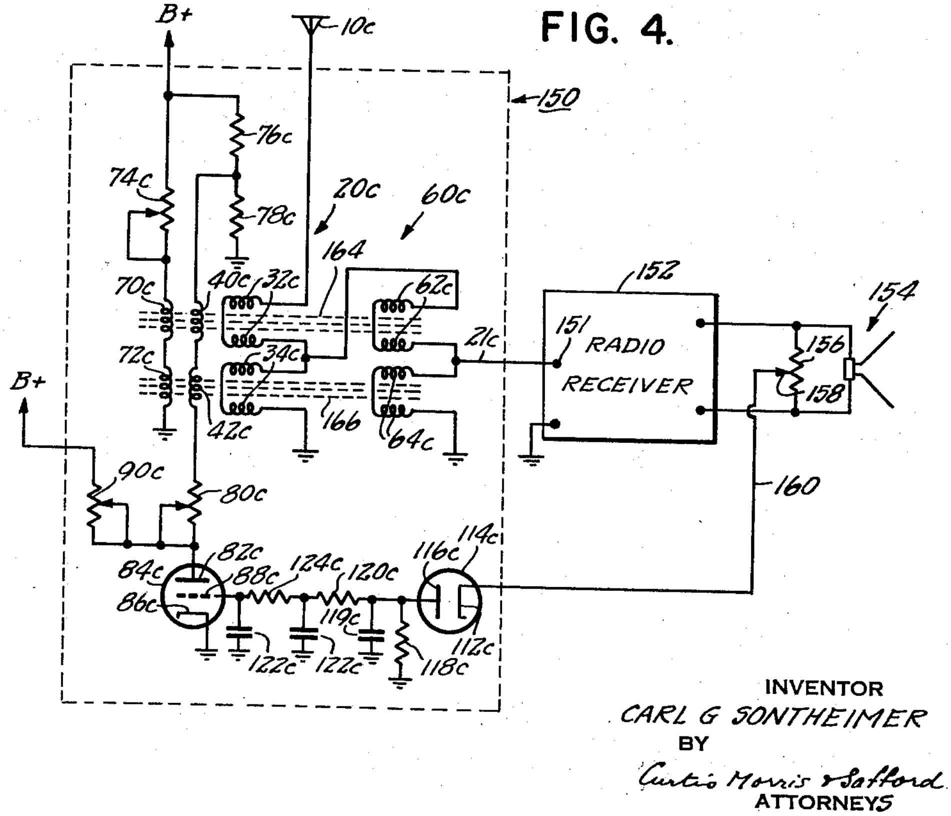
Figure 4 is another schematic circuit diagram, partially in block form illustrating other method and apparatus embodying the present invention.

In Figure 4 is shown another method for producing A. V. C.; this method utilizes a cascaded voltage divider A. V. C. circuit 150, indicated generally within a dotted line connected between an antenna 10*c* and an antenna input terminal 151 of a radio receiver indicated in block form at 152. Connected to the output of the radio receiver 152 is a loudspeaker 154 with a potentiometer 156 connected across the speaker coil. The movable contact 158 of the potentiometer 156 is connected through a lead 160 to the circuit 150 to control its operation. In Figure 4, parts performing functions corresponding to those in the earlier figures have corresponding reference numerals followed by the suffix "*c*."

This circuit has many advantages. For example, the circuit 150 can be built on a separate chassis and by means of a few connections is readily plugged into place between an antenna and a receiver. This arrangement is well suited for use in receiving Morse code signals. In carrier wave reception, for example, with the circuit 150 in place, the receiver sensitivity can be turned up to its maximum level, thus permitting maximum signal selection, while the circuit 150 prevents the radio frequency circuits in the receiver from being overloaded. To control the volume, the operator merely sets the movable contact 158 along the potentiometer 156 to a position providing the desired loudness in the tone signals coming from the loudspeaker 154 by means of the A. V. C. action described below. This same circuit 150 can be used, of course, to control the loudness from the loudspeaker of any type of radio receiver.

With the control unit 150 on a separate chassis, it is connected to the receiver 152 by means of only three connections. The first is the lead 160 which supplies the signal from the loudspeaker circuit to the unit 150 to control its operation as described hereinafter. The second connection is the lead 21c from the output of the second voltage divider 60c to the antenna connection 151 of the receiver 152. The lead 21c is conected to the terminal 151 just as if it were a lead coming directly from an antenna. The third connection from the chassis for the circuit 150 to the radio receiver 152 is the common return circuit connection indicated by the "ground" symbols. If desired, high voltage direct current from the power supply circuit within the radio receiver can be connected to the terminals marked B+. Alternatively, the unit 150 can include its own power supply to provide the B+ voltage.

In operation, the signal from the antenna 10c is applied across the first voltage divider 20c including the signal windings 32c and 34c if two controllable inductors connected in series. The output from voltage divider 20c is fed through a lead 58c to the second voltage divider circuit 60c, which includes a pair of signal windings 62c and 64c connected in series. The output from circuit 60c is fed through the lead 21c to the radio receiver.

In the circuit 150 two controllable inductors are used; the first of these controllable inductors includes the windings 32c and 62c both wound on a common core portion 164. This first inductor also includes a control winding 40c and a bias winding 70c, arranged to control the saturation of the core portion 164. These windings 40c and 70c are connected in the same sense so that when current flows in the same direction through them their fluxes add in the core 164. The second controllable inductor includes the two signal windings 34c and 64c wound on a common core portion 166 whose saturation is regulated by the action of a control winding 42c and a bias winding 72c.

The windings 72c and 42c are connected in opposite sense. With this arrangement, the inductance of the pairs of signal windings on the respective cores 164 and 166 are simultaneously varied. When equal currents are flowing down through the bias windings 70c and 72c and down through the control windings 40c and 42c, the common core 164 is saturated and the core 166 is unsaturated, thus producing maximum output at the terminal 162 of the radio receiver.

Assuming that the strength of the signal at the antenna reduces slightly, the alternating voltage appearing on the lead 160 from the loudspeaker circuit decreases, thus decreasing the rectified negative voltage produced by a rectifier 114c connected between the lead 160 and a load resistor 118c in parallel with a condenser 119c. Consequently, the grid 88c of a triode 84c becomes slightly less negative, increasing the current flowing from B+ through the triode load resistor 90c, and reducing the signal strength on the lead 21c to compensate for the increase in strength of the signal at the antenna 10c.

When the circuit 150 is being used with a receiver tuned to receive code signals, I prefer to use the diode 114c with a resistor 118c and condenser 119c having a sufficiently long time-constant that they act as a peak detector. When used with a receiver tuned for AM or FM reception, the diode 114c and the resistor 118c and condenser 119c are preferably arranged to provide a signal at the grid 88c which is proportional to the average level of the audio signals flowing through the loudspeaker 154.

Although the present invention has been described as embodied in radio receiver systems wherein it is the radio frequency signals that are attenuated, it will be understood that the controllable voltage divider circuits described are well suited for controlling a wide variety of signals. For example, they find many applications in audio frequency A. V. C. circuits, such as in controlling the level of audio signals fed from a microphone through an audio amplifier. The fact that the present A. V. C. circuit produces no "thump" during rapid changes in the degree of attenuation makes it particularly valuable in quick-acting A. V. C. systems of all types.

From the foregoing description it will be understood that the electrically controllable inductance voltage divider circuits of the present invention are well adapted to provide the many advantages discussed above, and that the apparatus described can be adapted to a wide variety of different applications and that various changes or modifications may be made therein, each as may be best suited to a particular application, and that the scope of the present invention, as defined by the following claims, is intended to include such modifications or adaptations limited only by the prior art.

What is claimed is:

1. An electrically controllable inductance voltage divider circuit for dividing an input signal and feeding a controllable fraction thereof to an output circuit while avoiding any variation in impedance loading on the source of the input signal comprising a tuned circuit including at least an inductance element and a capacitance element, an input circuit coupled to said tuned circuit for feeding an alternating signal thereto, first and second magnetically permeable and saturable core portions, first and second controllable inductance windings wound on said first and second core portions, respectively, said first and second windings being connected in series across an inductance element in said tuned circuit, an output circuit having two input connections, one of said connections being connected to said windings at a point electrically between them, the other of said connections being connected to the opposite side of said first winding from said point for connecting said output circuit across said first winding, a source of magnetic flux associated with each of said core portions to regulate the degree of magnetic saturation thereof, and a control connected to said source and arranged to change the magnitude of the flux in said core portions in opposite directions, while maintaining constant the sum of the inductances of said first and second windings in series.

2. An alternating signal amplifier circuit comprising first and second input terminals, an amplifier stage adapted to amplify the alternating signals from said input terminals and having a control electrode, an electrically controllable inductance voltage divider circuit directly controlling the amplitude level of the alternating signals applied from said terminals to said control electrode and including, first and second magnetically permeable and saturable core portions, first and second controllable inductance windings wound on said first and second core portions, respectively, said first and second windings being connected in series between said first and second input terminals, a first output connection connected between said windings and coupled to said control electrode, a second output connection to said amplifier stage from the opposite side of said first winding electrically coupling said amplifier stage across said first winding, a source of magnetic flux associated with each of said core portions to regulate the degree of magnetic saturation thereof, and a control connected to said source and arranged to change the flux in said core portions in opposite directions.

3. An electrically controllable inductance voltage divider circuit comprising a pair of input terminals, first and second magnetically permeable and saturable core portions, first and second controllable inductance windings wound on said first and second core portions, respectively, and being connected in series between said input terminals, a first output connection connected between said windings, a second output connection coupled to the opposite side of said first winding from said first connection, said first and second output connections defining opposite sides of a load circuit across said first windings, first and second controllable sources of magnetic flux associated with said first and second core portions, respectively, to regulate the degree of magnetic saturation thereof, and a control connected to both of said sources and arranged to increase the flux in one of said core portions while decreasing the flux in the other of said core portions, said control being arranged to maintain the sum of the inductances of said windings substantially constant.

4. An electrically controllable inductance voltage divider circuit for producing a change in electrical output power over a wide range comprising a pair of input terminals, a pair of magnetically permeable and saturable core portions, first and second controllable inductance windings, each wound on a respective one of said core portions, said windings being connected in series between said input terminals, a first output connection connected between said windings, a second output connection at a point electrically adjacent to the opposite side of said first winding from said first output connection, said first and second output connections defining an output circuit coupled across said first winding, a source of bias magnetic flux associated with each of said core portions and arranged to establish a bias flux level of predetermined polarity in each of said core portions, a pair of control windings, each associated with a respective one of said core portions, a variable current source, circuit means connecting one of said control windings to said current source with the same polarity as the bias source for its core portion and the other control winding with polarity opposite from the bias source for its respective core portion, whereby the flow of current from said source through said windings increases the saturation of one of said core portions and simultaneously reduces the saturation of the other core portion.

5. An electrically controllable inductance voltage divider circuit comprising a pair of input terminals, a pair of magnetically permeable and saturable core portions, a pair of controllable inductance windings, each wound on a respective one of said core portions, said windings being connected in series between said input terminals, an output connection between said windings, a pair of bias windings, each associated with a respective one of said core portions and connected in series, a current source connected thereto and arranged to establish a bias flux level of predetermined polarity in each of said core portions, a pair of control windings, each associated with a respective one of said core portions and connected in series, one of said control windings being wound in the same sense as one of said bias windings, the other control winding being wound in the opposite sense from the other bias winding, first resistance means connected across said source, a tap on said resistance means connected to one side of said series-connected control windings, a control circuit including second resistance means and current control means in series therewith, said control circuit also being connected across said source, circuit means connecting the opposite side of said series-connected control windings to the junction of said second resistance means and said current control means in said control circuit.

6. A wide range voltage divider circuit comprising a pair of input terminals, a first pair of magnetically permeable and saturable core portions, first and second controllable inductance windings each wound on a respective one of said core portions, said windings being connected in series between said terminals, a first connection between said windings, a second connection adjacent to one side of said second winding, magnetic flux means associated with each of said core portions and arranged to increase the saturation of one of said core portions while decreasing the saturation of the other core portion, a second pair of magnetically permeable and saturable core portions, third and fourth controllable inductance windings each wound on a respective core portion of said second pair, said third and fourth windings being connected in series between said first and second connection, a third connection between said third and fourth windings, a fourth connection adjacent to one side of said third and fourth connections defining a load circuit, and other magnetic flux means associated with each of said core portions of said second pair and arranged to increase the saturation of one of said latter core portions while decreasing the saturation of the other.

7. A wide range voltage divider circuit comprising a pair of input terminals, first and second magnetically permeable and saturable core portions, first and second controllable inductance windings wound on said first and second core portions, respectively, said windings being connected in series between said terminals, a first connection between said windings, third and fourth controllable inductance windings wound on said first and second core portions, respectively, and being connected in series to said first connection, an output connection between said third and fourth windings, and first and second control windings associated with said first and second core portions, respectively, and arranged to regulate the degree of magnetic saturation of said first and second core portions, respectively.

8. A wide range voltage divider circuit comprising a pair of input terminals, a first pair of magnetically permeable and saturable core portions, first and second controllable inductance windings each wound on a respective one of said core portions, said windings being connected in series between said terminals, a first connection between said windings, magnetic flux means associated with each of said core portions and arranged to increase the saturation of one of said core portions while decreasing the saturation of the other core portion, third and fourth controllable inductance windings, said third winding wound on the same core portion as said first winding, said fourth winding wound on the same core portion as said second winding, said third and fourth windings being connected in series to said first connection, and an output connection therebetween.

9. A wide range voltage divider as claimed in claim 8 and wherein said magnetic flux means comprises a pair of bias windings connected in series, one of said bias windings being wound on each of said core portions, a source of bias current connected thereto, a pair of control windings connected in series, one of said control windings being wound on each of said core portions, one of said control windings being connected in the same sense as the bias winding on its core portion, the other control winding being connected in the opposite sense from the other bias winding.

10. In a radio receiver system having an antenna circuit and signal amplification means, apparatus for controlling the strength of the signal fed from said antenna circuit to said signal amplification means comprising a pair of terminals coupled to said antenna circuit, a plurality of magnetically permeable and saturable core means, a plurality of controllable inductances each wound on one of said core means and connected in series between said terminals, electromagnetic means arranged to change the degree of saturation of at least two of said core means in opposite directions, an output circuit across at least one of said inductances and being connected to said amplification means, rectifier and filter means in said receiver connected to said signal amplification means, and circuit means coupling said electromagnetic means to said filter means.

11. In a radio receiver system having an antenna circuit and signal amplification means, apparatus for controlling the fraction of the signal strength in the antenna circuit which is fed into the amplification means comprising first and second magnetically permeable and saturable core portions, first and second controllable inductance windings wound on said first and second core portions, respectively, and being connected in series, first circuit means coupling said inductance windings into said antenna circuit to feed the signal of the antenna circuit through said windings, second circuit means coupling the fraction of the signal appearing across one of said windings to said amplification means, rectifier and filter means coupled to said amplification means, a source of bias magnetic flux associated with each of said core portions and arranged to establish a bias flux level of predetermined polarity in each of said core portions, a pair of control windings, each associated with a respective one of said core portions, third circuit means connecting one of said control windings to said filter means with the same polarity as the bias source for its core portion and fourth circuit means connecting the other control winding to said filter means with the opposite polarity from the bias source for its respective core portion, whereby the flow of current from said rectifier and filter means through said windings increases the saturation of one of said core portions and simultaneously reduces the saturation of the other core portion in accordance with changes in average signal strength in said amplification means.

12. In a radio receiver system having an antenna circuit and signal amplification means, apparatus for controlling the fraction of the signal intensity in the antenna circuit which is fed into the amplification means comprising first and second magnetically permeable and saturable core portions, first and second controllable inductance windings wound on said first and second core portions, respectively, and being connected in series, first circuit means coupling said inductance windings into said antenna circuit to feed the signal of the antenna circuit through said windings, second circuit means coupling the fraction of the signal intensity available across the second of said windings to said amplification means, a source of bias magnetic flux associated with each of said core portions and arranged to establish a bias flux level of predetermined polarity in each of said core portions, first and second control windings, associated with said first and second core portions, respectively, said control windings being connected in series, a controllable source of current, third circuit means connecting said control windings to said controllable current source, said first control winding being connected to have the same polarity as the bias source for its core portion, said second control winding being connected to have opposite polarity from the bias source for its respective core portion, rectifier and filter means coupled to said signal amplification means, said rectifier and filter means being connected to said controllable current source to regulate the current in said control windings whereby the saturation of said core portions is varied in opposite directions in accordance with changes in average signal strength in said signal amplification means.

13. Apparatus for providing automatically controlled attenuation of the signal level in a radio receiver comprising an input circuit adapted to be coupled to a signal source, first and second magnetically permeable and saturable core portions, first and second controllable inductance windings wound on said first and second core portions, respectively, and being connected in series, first circuit means coupling said inductance windings to said input circuit to feed the signal of the input circuit through said windings, an output circuit having two connections, one of said connections being between said windings the other connection being adjacent to the other side of said second winding, said two connections being adapted to be connected to a portion of the receiver to feed an attenuated signal thereto, first and second bias sources of magnetic flux associated with said first and second core portions and arranged to establish a bias flux level of predetermined polarity in each of said core portions, first and second control windings associated with said first and second core portions, respectively, and being connected in series, a control connection adapted to be connected to said receiver to sense the signal level therein, rectifier means coupled to said control connection, filter means connected to said rectifier, control amplifier means connected to said filter means, said control amplifier means being connected to said control windings to send current through said windings to induce control flux in said core portions, said control windings being connected in opposite sense so that the control and bias fluxes in one of said core portions are additive while the control and bias fluxes in the other core portion oppose each other.

14. Apparatus as claimed in claim 13 wherein said output circuit includes third and fourth controllable inductance windings wound on said first and second core portions, respectively, and being connected in series, and an output terminal connected between said third and fourth windings adapted to be connected to a portion of the receiver.

15. Apparatus as claimed in claim 13 wherein said control amplifier means includes a resistor in series with an electronic control device, with the control windings being connected to a point between said resistor and device, the other end of said resistor being connected to a direct voltage source.

16. Apparatus as claimed in claim 13 wherein said control connection includes a potentiometer connected in the loudspeaker circuit of the receiver.

17. A radio receiver system comprising a first circuit adapted to pass through itself radio frequency signals, a second circuit in said receiver system positioned after said first circuit and adapted to amplify the radio frequency signals after they have passed through said first circuit, said second circuit having a control electrode and a common connection, a controllable inductance voltage divider circuit coupled between said first and second circuits and controlling the amplitude of the radio frequency signals applied between said common connection and said control electrode, said voltage divider circuit having first and second terminals coupled to said first circuit, said second input terminal also being coupled to said common connection, first and second magnetically permeable and saturable core portions, first and second controllable inductance windings wound on said first and second core portions, respectively, said first and second inductance windings being connected in series between said first and second input terminals, an output connection connected between said windings and coupled to said control electrode, a source of magnetic flux associated with each of said core portions to regulate the degree of magnetic saturation thereof, and a control connected to said source and arranged to change the flux in said core portions in opposite directions.

18. A radio receiver system comprising an antenna circuit, a radio frequency amplifier circuit adapted to amplify the radio frequency signals appearing in said antenna circuit and including a control electrode, a controllable inductance voltage divider circuit regulating the amplitudes of the radio frequency signals applied to said control electrode including first and second controllable inductance windings connected in series and coupled to said antenna circuit, first and second magnetically permeable and saturable core portions coupled to said first and second windings, respectively, an output connection coupled from a point intermediate said windings to said control electrode, a source of magnetic flux associated with each of said core portions to regulate the degree of magnetic saturation thereof, and a control connected to said source and arranged to change the flux in said core portions in opposite directions.

19. A radio receiver system as claimed in claim 17 and wherein said output connection includes third and fourth controllable inductance windings in series and having third and fourth magnetically permeable and saturable core portions, respectively, said third winding being coupled to a point intermediate said first and second winding, said fourth winding being coupled to said common connection, circuit means coupling a point intermediate said third and fourth windings to said control electrode, and magnetic flux means arranged to vary the saturation of said third and fourth core portions in opposite directions.

20. An alternating signal amplifier circuit as claimed in claim 2 and wherein said control maintains substantially constant the sum of the inductances of said controllable inductance windings in series between said first and second terminals while their individual inductances are changed in opposite directions.

References Cited in the file of this patent

UNITED STATES PATENTS

| | | |
|---|---|---|
| 1,838,987 | Cooper | Dec. 29, 1931 |
| 1,866,456 | Fichandler | July 5, 1932 |
| 2,078,880 | Logan | Apr. 27, 1937 |
| 2,085,927 | Sorensen | July 6, 1937 |
| 2,104,087 | Linsell | Jan. 4, 1938 |
| 2,487,675 | Rutherford | Nov. 8, 1949 |
| 2,581,202 | Post | Jan. 1, 1952 |
| 2,601,384 | Goodrich | June 24, 1952 |
| 2,714,187 | Goodrich | June 26, 1955 |

FOREIGN PATENTS

| | | |
|---|---|---|
| 694,551 | France | Sept. 16, 1930 |

UNITED STATES PATENT OFFICE

Certificate of Correction

Patent No. 2,849,603 August 26, 1958

Carl G. Sontheimer

It is hereby certified that error appears in the above numbered patent requiring correction and that the said Letters Patent should read as corrected below.

In the drawings, sheets 1 and 2, the following corrections should appear—

In Fig. 1, instead of the "ground" symbol at the lower end of resistor 57, there should be a downwardly directed arrowhead. Also, in Fig. 1, the controllable inductor including the windings 32 and 40 should bear the general reference numeral 31, and the controllable inductor including the windings 34 and 42 should bear the general reference numeral 33.

In Fig. 2, instead of the "ground" symbol at the lower end of resistor *57a* there should be a downwardly directed arrowhead.

In Fig. 3, the lead which extends from the juncture of the windings *32b* and *34b* to the top of the winding *62b* should bear the reference numeral *58b*.

In Fig. 4, the lead which extends from the juncture of the windings *32c* and *34c* to the end of the winding *62c* should bear the reference numeral *58c*.

in the printed specification, column 10, line 4, for "connections" read —windings—; column 12, line 37, after "second" insert —input—.

Signed and sealed this 23rd day of June 1959.

[SEAL]

Attest:
KARL H. AXLINE,
*Attesting Officer.*

ROBERT C. WATSON,
*Commissioner of Patents.*